Figure 2:
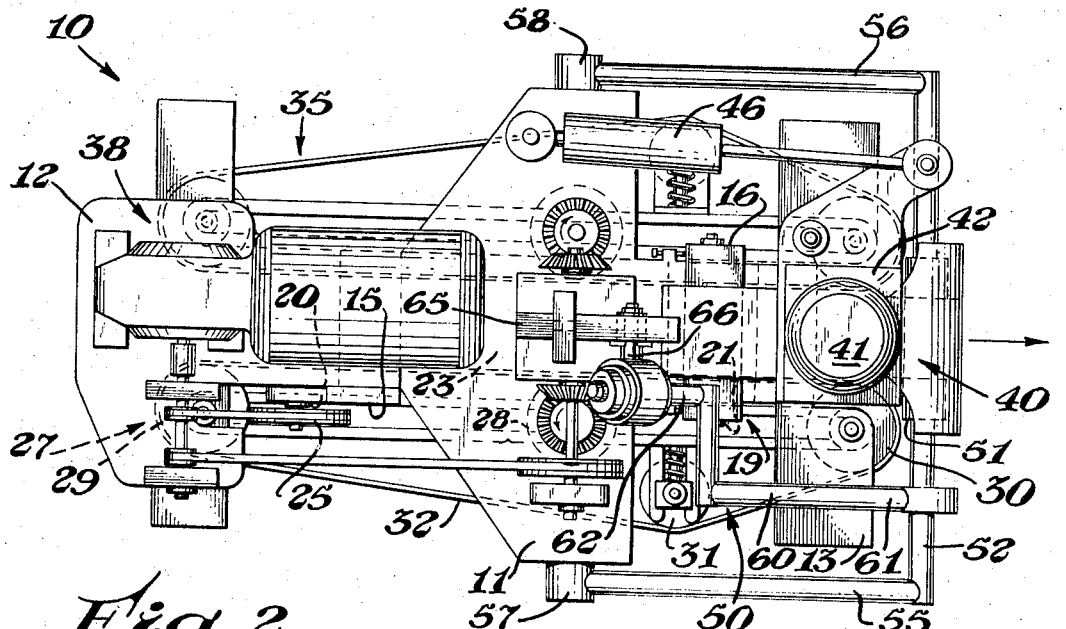

Jan. 28, 1969     H. S. SMITH, JR., ET AL     3,423,791
APPARATUS FOR FORMING WALLED STRUCTURES OF PLASTIC FOAM
Filed Sept. 28, 1966     Sheet 1 of 3

INVENTORS.
Hubert S. Smith, Jr.
Donald R. Wright
BY

AGENT

INVENTORS.
Hubert S. Smith, Jr.
Donald R. Wright
BY

AGENT

United States Patent Office 3,423,791
Patented Jan. 28, 1969

3,423,791
APPARATUS FOR FORMING WALLED STRUCTURES OF PLASTIC FOAM
Hubert S. Smith, Jr., Bay City, and Donald R. Wright, Midland, Mich., assignors to The Dow Chemical Company, Midland, Mich., a corporation of Delaware
Filed Sept. 28, 1966, Ser. No. 582,670
U.S. Cl. 18—5    4 Claims
Int. Cl. B29d 25/00; B29c 23/00, 27/00

This invention relates to walled structures of plastic foam, and more particularly relates to walled structures of plastic foam which are generated incrementally.

United States Patent 3,206,899 discloses a method and apparatus for the preparation of walled structures by a process utilizing thermoplastic foam strips which are spirally or helically disposed in a generally continuous manner and adhered to adjacent strips to form a walled structure. Particulate expandable synthetic resinous thermoplastic materials may also be used to form such structures. The formation of structures from prefoamed components or from particulate expandable plastic materials offers some significant disadvantages. Usually, the raw material from which such structures are prepared must be transported to the building site as foamed elements or as particulate foamable elements which are handled with some difficulty. Further, the particulate foamable particle or elements require a relatively high mold pressure which necessitates rather sturdy molds or forming means. The shipment of plastic foam is relatively expensive because of its low bulk density. The handling of particulate expandable material also offers significant difficulty in transportation to the operating or foam laying head of the apparatus and offers substantial disadvantages because of the heating techniques required to obtain satisfactory expansion and bonding together of the expandable particles to form a unitary body. Foamable or expandable particles or prefoamed plastic strips have numerous disadvantages when it is desired to incorporate within the wall of the structure various conduits, reinforcements and the like. Expandable particulate particles are not readily formed into intricate shapes. When employing prefoamed elements, it is costly to use a strip that deviates appreciably from a rectangular cross-section. Oftentimes, when depositing a foamable hardenable composition to form a wall structure, employing the spiral generation technique, the height of the foam layer or strip deposited varies with the position of the foaming head. Such a technique is disclosed in our copending application Ser. No. 513,998 filed Dec. 15, 1965 for "Walled Structures of Plastic Foam."

It would be extremely desirable to employ an apparatus for the deposition of foamable hardenable material with a spiral generation technique wherein the height of the foamable material is maintained substantially constant.

It would also be advantageous if there were available an apparatus for the deposition of formable hardenable material which is capable of depositing a strip of a generally uniform height and such height may be readily varied.

These benefits and other advantages in accordance with the present invention are achieved in an apparatus for the formation of a walled structure by a spiral generation technique which comprises in operative cooperation means so constructed and arranged so as to position an operating head at a desired location and to successively deposit a synthetic resinous foamed material to form a walled structure, the improvement which comprises a spacing means pivotally supported adjacent and forward of a means to provide a foamable hardenable synthetic resinous material, the spacing means adapted to engage the previously deposited foam layer in a plane of a forming surface of a top belt of the depositing head, the spacing means being adjustably secured to a frame of the depositing head and adapted to be moved in a direction generally normal to the forming surface of the top belt of the depositing head.

Figure 1:
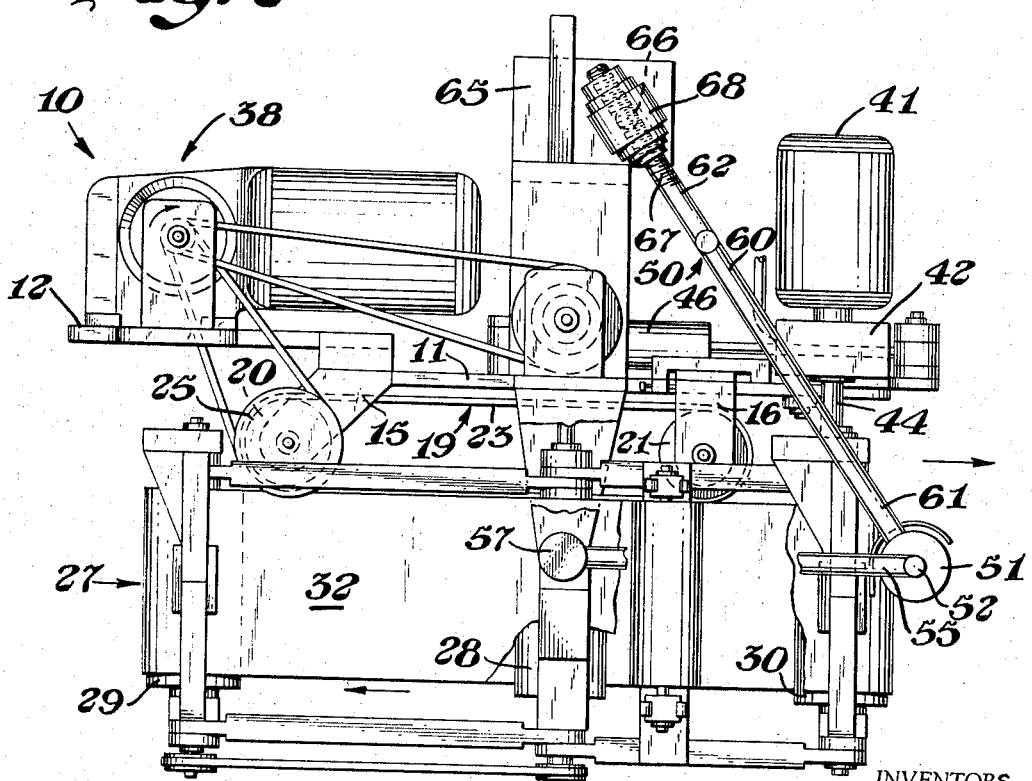
Figure 3:
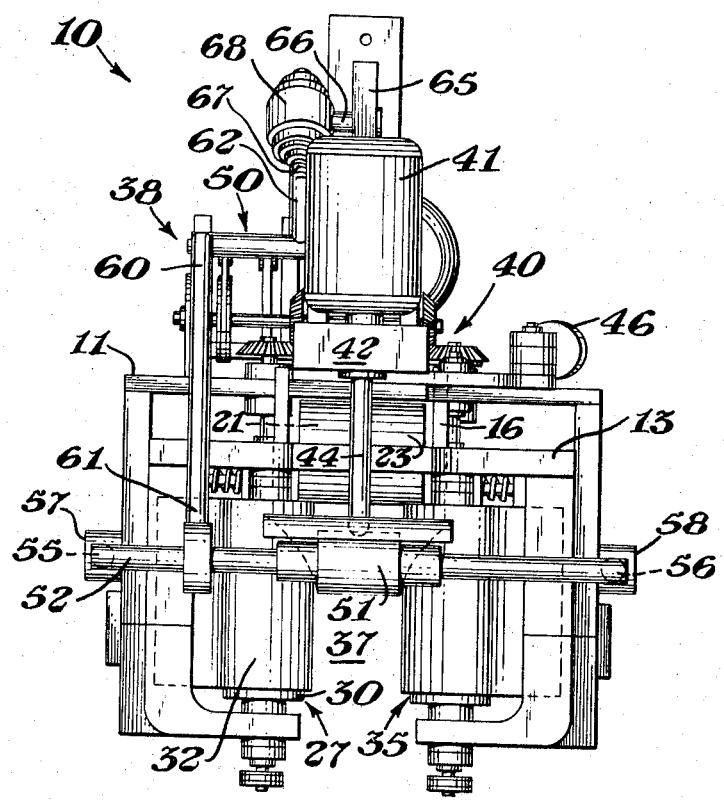
Figure 4:
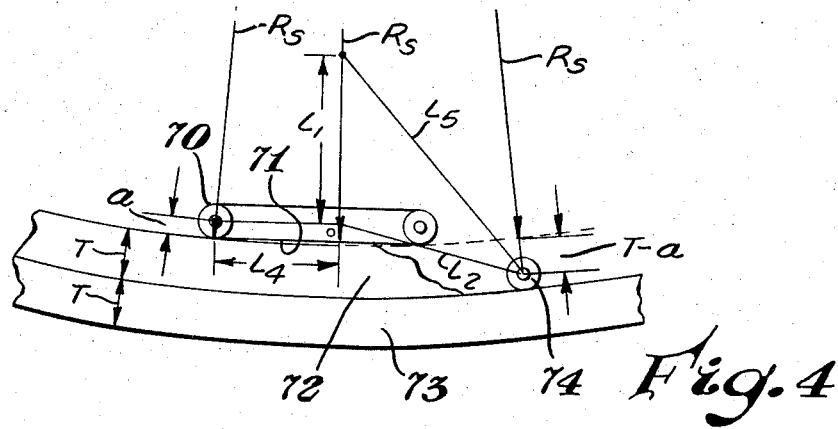
Figure 5:
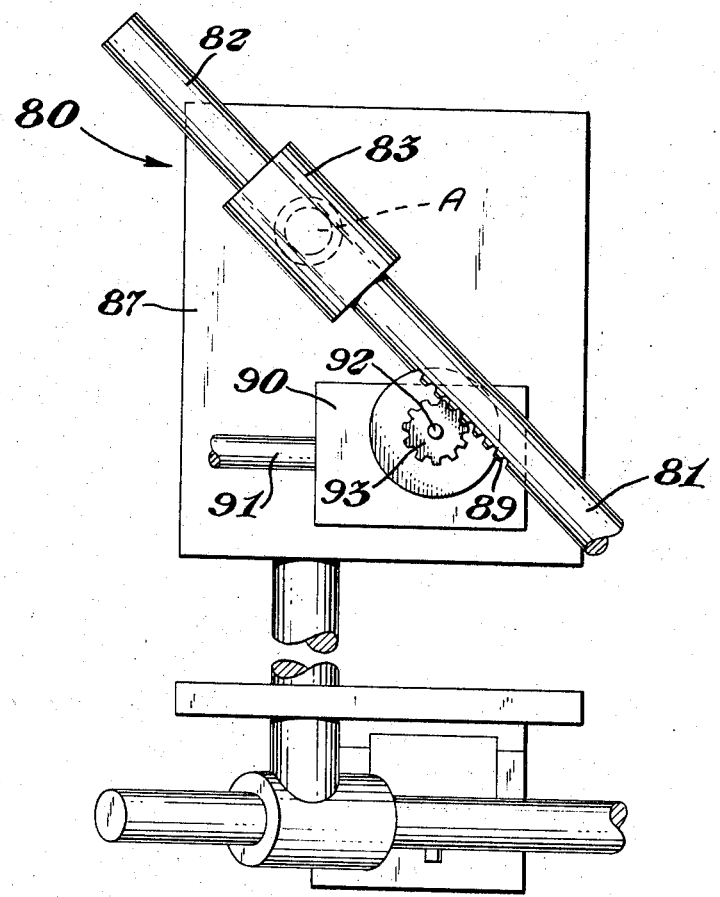

Further features and advantages of the present invention will become more apparent from the following specification when taken in connection with the drawing wherein:

FIGURE 1 is a side view of an apparatus in accordance with the invention.
FIGURE 2 is a top view of a foam depositing head in accordance with the invention.
FIGURE 3 is a front view of the apparatus of FIGURES 1 and 2.
FIGURE 4 is a schematic representation of the rotations between the dimensions of apparatus in accordance with the invention.
FIGURE 5 is a schematic representation of a variable length arm.

In FIGURES 1, 2 and 3, there is schematically depicted a foam depositing head in accordance with the present invention generally designated by the reference numeral 10. The foam depositing head 10 comprises in cooperative combination a frame assembly 11, the frame having a first end 12 and a second or front end 13, a first top belt support 15 and a second top belt support 16. The top belt supports 15 and 16 support a top belt assembly 19 comprising a first roll or drum 20, a second roll or drum 21 and an endles top belt 23. A drive pulley 25 is in operative connection with the drum 20. A first side belt assembly 27 is disposed adjacent the top belt assembly. The first side belt assembly comprises a driven roll 28, a first roll 29, a second roll 30 and an intermediately disposed idler roll 31. An endless belt 32 passes about the rolls 28, 29, 30 and 31. The side belt assembly 27 is supported from the frame 11 in such a manner that one face of the belt 32 is disposed generally at right angles to an adjacent face of the belt 23 which is remote from the frame 11. A like second side belt assembly generally designated by the reference numeral 35 is oppositely disposed from the first side belt assembly 27. The side and top belt assemblies define a three-sided open channel 37. The side belt assembly 35 is substantially a mirror image of the assembly 27. A drive train generally designated by the reference numeral 38 is operatively connected to the top and side belt assemblies by suitable belting and gearing to provide motion of the belts in the direction indicated by the arrows and cause the surface in the channel 37 to progress from the front to the rear of the foam depositing head. A foam dispensing assembly generally designated by the reference numeral 40 is pivotally affixed to the front end 13 of the frame 11. The foam depositing assembly comprises a motor 41 and a mixing chamber 42 and a dispensing tube 44 extending into the channel 37. A linear actuator 46 is operatively connected and pivotally mounted to the frame and adapted to oscillate the foam dispensing conduit 44 within the portion of the channel 37 adjacent the first end 13 of the frame 11. A positioning roll assembly 50 affixed to the frame 11 comprises a positioning roll 51 adapted to freely rotate about an axis generally parallel to the surface of the top belt 23 forming a portion of the channel 37. The axis of the roll 51 is also generally parallel to the axes of the rolls 19 and 21. The roll 51 is carried by a positioning roll shaft 52 extending generally transversely to the frame 11 and positioned adjacent the front end 13. The shaft 51 is carried by a first side arm 55 and a second side arm 56. The side arm 55 is generally adjacent the first side belt assembly 27 and generally adjacent the second side belt assembly 35. The side arms 55 and 56 are pivotally attached to the frame 11 by means of the pivots 57 and 58.

The arms 55 and 56 pivot about the pivots 57 and 58 in such a manner that the axis of rotation of the arms 55 and 56 is generally parallel to the axis of shaft 52. An adjustable arm 60 having a first end 61 and a second end 62 is pivotally affixed to the shaft 52 at its first end 61. The second end 62 of the adjustable arm 60 is pivotally affixed to a portion of the frame 65 from which the foam depositing head is supported. The foam depositing head is adapted to rotate about an axis generally parallel to the top belt 16 and parallel to the channel 37 from a supporting boom. A pivot 66 affixed to the second end 62 secures the adjustable arm 60 to the frame portion 65. The adjustable arm 60 has an expanding and contracting section 67 which is adapted to alter the distance between the pivot 66 and the shaft 52. An adjusting means 68 is provided whereby the length of the arm is altered.

In operation of the embodiment of the apparatus depicted in FIGURES 1–3, the foam depositing head is positioned between a starter strip or other base upon which a foam structure is to be prepared. The starter strip or base is partially inserted into the channel 37 to define a four-sided channel, three sides of which are defined by the endless belts of the foam depositing head. The length of the arm 60 is adjusted to provide a desired spacing of the top belt 23 from the base, the spacing roll 51 contacting the base. Activation of the drive means 38 causes the apparatus to be propelled in the direction indicated by the arrow adjacent the front end 13 of the frame. A suitable hardenable foaming material such as a polyurethane foam composition is fed to the foam dispensing apparatus 40 where it is discharged from the conduit 44 into the channel defined by the belts and the base. In building a spherical structure, the foam depositing head travels in a circular path at the end of a pivoting boom and deposits successive layers of foamable material one on top of the other in a spiral pattern to provide a hemispherical structure generally in the manner of the apparatus of U.S. Patent 3,206,899. However, as the radius of the circle about which the foam depositing head travels decreases, it is necessary in order to maintain a constant foam height per base to adjust the length of the adjustable arm 60.

FIGURE 4 depicts the basic geometry involved and schematically shows a top belt assembly 70. The top belt assembly 70 has a foam engaging face 71 which engages freshly deposited foam 72 overlying the previously deposited hardened foam layer 73. A spacing roll 74 having a radius $a$ is in engagement with a surface of the previously deposited strips of foam layer 73. $R_s$ is the radius of curvature of the upper surface of the foam being deposited. $L_1$ is the distance between the center line of the two rolls supporting the top belt and the pivot point such as the point 65 of the apparatus 10. $L_2$ is the length between centers of the arms 55 and 56. $L_4$ is the distance between the center of the rear most roll and a line normal to a line connecting the centers of the rolls of the top belt and passing through the pivot belt. $L_5$ is the length of the variable length arm or the distance between the pivot point and the axis of rotation of the spacing roll. $a$ is the radius of the rear most roll plus the thickness of the belt. $T$ is the thicknes of the layer being deposited. $T-a$ is the spacing between the center of the spacing roll and a projected surface of the layer being deposited. The length of $L_5$ and the variable length link at any given instant is given by the equation $$L_5 = \sqrt{L_1^2 + L_2^2 - \frac{1}{\sqrt{(R_s-a)^2 - L_4^2}} [L_2^2 - L_4^2 + (R_s-a)^2 - (R_s+T-a)^2]}$$

In practice, the difference in length is relatively small and the length adjustment of the linkage may be incrementally or continuously accomplished either manually or automatically.

In FIGURE 5 there is represented a fractional view of one embodiment of an adjustable link for apparatus of the present invention generally designated by the reference numeral 80. The variable link 80 comprises a link 81 corresponding to $L_5$ of FIGURE 4 and arm 60 of FIGURES 1, 2 and 3. The arm 81 has a first end 82 slidably journalled within a bearing 83 which is adapted to rotate about a point A which lies on the center of the connection to a boom supporting the foam depositing apparatus. The bearing 83 is pivotally affixed to a frame 87 generally corresponding to the location 65 of FIGURE 1. The arm 81 has a rack portion 89. A gear reducer 90 is supported upon the frame 87. The gear reducer 90 has an input shaft 91 and an output shaft 92. The output shaft 92 has affixed thereto a spur gear 93 which is in operative engagement with the rack 89. Thus, rotation of the input shaft 91 causes rotation of the output shaft 92 and rotation of the spur gear 93 which moves the arm 81 within the bearing 83, effectively altering the length of the arm and the thickness of the layer deposited.

A foam depositing head generally as illustrated in FIGURES 1, 2 and 3 provides structures having a relatively uniform thickness of the deposited layers.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. In an apparatus for the formation of a walled structure by a spiral generation technique which comprises in operative cooperation means so constructed and arranged so as to position an operating head at a desired location and to successively deposit a synthetic resinous foamed material to form a walled structure, the improvement which comprises a spacing means pivotally supported adjacent and forward of a means to provide a foamable hardenable synthetic resinous material, the spacing means adapted to engage the previously deposited foam layer in a plane of a forming surface of a top belt of the depositing head, the spacing means being adjustably secured to a frame of the depositing head and adapted to be moved in a direction generally normal to the forming surface of the top belt of the depositing head.

2. The apparatus of claim 1 wherein the spacing means is a roll adapted to pivot about an axis generally parallel to the plane of the top forming belt and lying transverse to the direction of travel of the depositing head.

3. The apparatus of claim 1 wherein the spacing means is adjustably secured to the frame by a variable length link arm.

4. The apparatus of claim 3, including means to remotely vary the length of the link arm.

References Cited

UNITED STATES PATENTS 2,339,892  1/1944  Urschel _____ 25—131 X
2,506,716  5/1950  Finnemore _____ 25—131
3,206,899  9/1965  Wright.
3,336,631  8/1967  Smith _____ 18—5

J. HOWARD FLINT, Jr, *Primary Examiner.*

U.S. Cl. X.R.

25—131; 52—80